United States Patent [19]
De Haan et al.

[11] Patent Number: 5,608,697
[45] Date of Patent: Mar. 4, 1997

[54] RECORD CARRIER CONTAINING AN AUDIO AND/OR VIDEO SIGNAL WHICH HAS BEEN ENCODED AND INCLUDES A DECODER DELAY TIME PARAMETER INDICATING A TIME DELAY FOR ONE OR MORE PORTIONS OF THE SIGNAL

[75] Inventors: Wiebe De Haan; Jan Van Der Meer, both of Eindhoven, Netherlands

[73] Assignee: U.S. Philips Corporation, New York, N.Y.

[21] Appl. No.: 616,951

[22] Filed: Mar. 18, 1996

Related U.S. Application Data

[62] Division of Ser. No. 299,027, Aug. 31, 1994, which is a continuation of Ser. No. 86,402, Jun. 30, 1993, abandoned, which is a continuation of Ser. No. 711,186, Jun. 5, 1991, abandoned.

[30] Foreign Application Priority Data

Jun. 5, 1990 [GB] United Kingdom ................... 9012538

[51] Int. Cl.$^6$ .................................................. G11B 5/09
[52] U.S. Cl. ................... 369/48; 369/58; 369/60
[58] Field of Search .............................. 369/32, 33, 47, 369/48, 49, 50, 54, 58, 59, 60, 124, 275.3

[56] References Cited

U.S. PATENT DOCUMENTS

| 4,215,369 | 7/1980 | Iijima ........................... 358/146 |
|---|---|---|
| 4,382,299 | 5/1983 | Dieterich ........................... 371/8 |
| 4,472,803 | 9/1984 | Iijima ........................... 370/110.1 |
| 4,512,006 | 4/1985 | Murakami et al. ........................... 369/50 |
| 4,680,647 | 7/1987 | Moriyama ........................... 358/343 |
| 4,816,928 | 3/1989 | Sasaki et al. ........................... 360/35.1 |
| 4,985,784 | 1/1991 | Tsuboi et al. ........................... 358/342 |
| 5,130,816 | 7/1992 | Yoshio ........................... 358/341 |

OTHER PUBLICATIONS

Takahashi et al., "Interframe CODEC for NTSC Color Television Signals", Fujitsu Scientific & Technical Journal, vol. 13, No. 4, 1977, pp. 21–52.

Primary Examiner—Georgia Y. Epps
Assistant Examiner—P. W. Huber
Attorney, Agent, or Firm—Richard A. Weiss

[57] ABSTRACT

Methods and apparatus for encoding and decoding an audio and/or video signal, and a record carrier for use with such apparatus. One or more audio and/or full motion video signals, e.g., a video signal (and possibly computer data), are recorded on an interactive compact disc. The video signal prior to being recorded is encoded into code blocks of variable lengths, each corresponding to a picture or picture pair. A decoder delay time parameter associated with one or more of the code blocks, which parameter represents a length of time (i.e., a delay time) with which the corresponding picture of a code block is to be displayed after that code block has been received by a decoding apparatus is determined and included in the video signal prior to being recorded.

9 Claims, 4 Drawing Sheets

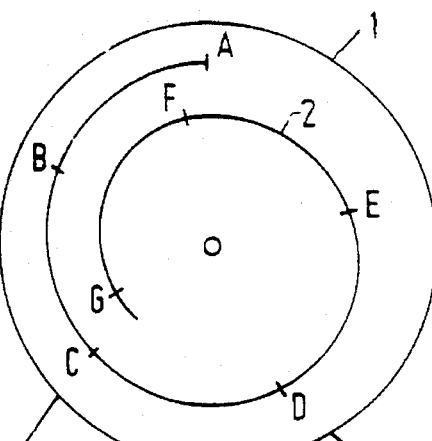
FIG.1A
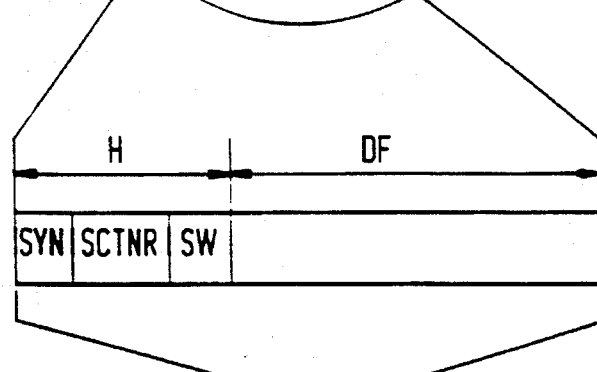
FIG.1B
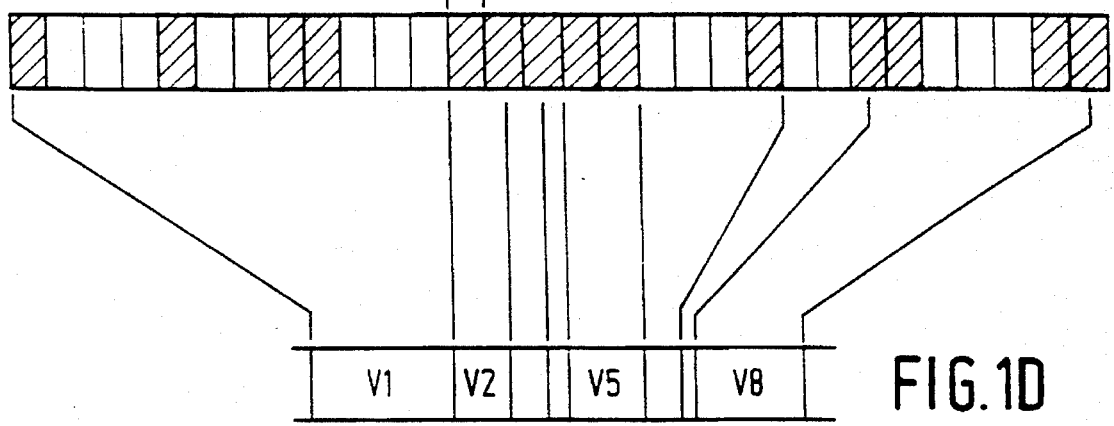
FIG.1C
FIG.1D
FIG.1E

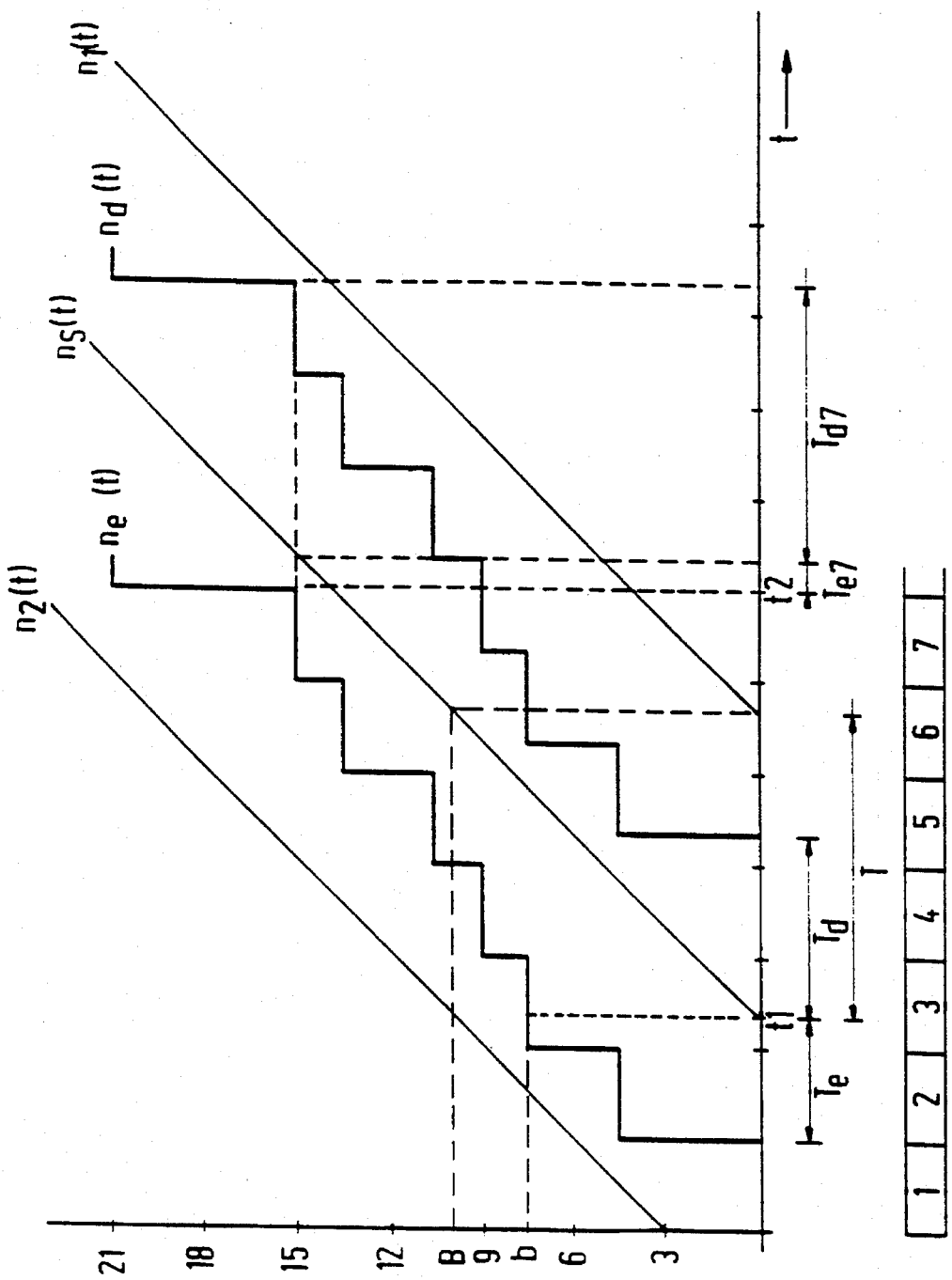

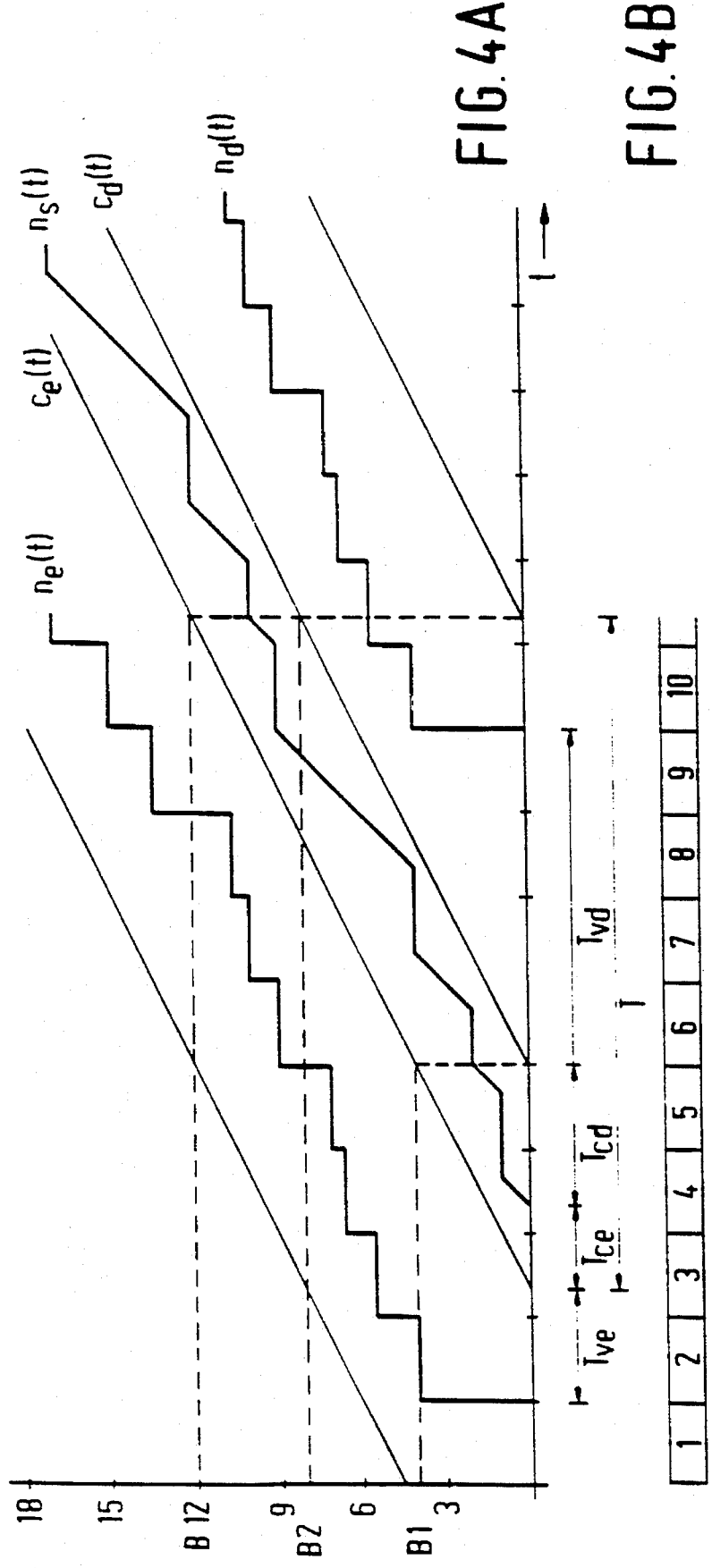

RECORD CARRIER CONTAINING AN AUDIO AND/OR VIDEO SIGNAL WHICH HAS BEEN ENCODED AND INCLUDES A DECODER DELAY TIME PARAMETER INDICATING A TIME DELAY FOR ONE OR MORE PORTIONS OF THE SIGNAL

CROSS REFERENCE TO RELATED APPLICATIONS

This is a division of application Ser. No. 08/299,027, filed on Aug. 31, 1994, which is a continuation of application Ser. No. 08/086,402, filed Jun. 30, 1993 and now abandoned, which was a continuation of application Ser. No. 07/711,186, filed Jun. 5, 1991 and now abandoned.

BACKGROUND OF THE INVENTION

The invention relates to a method of encoding audio and/or video signals for transmissions via a transmission medium. More particularly, the transmission medium is preferably an optically readable disc. Nevertheless, the transmission medium may also be a magnetic tape or disc, or a direct connection between a transmitter and a receiver. The invention also relates to a transmission medium on which audio and/or video signals are recorded, to an encoding apparatus for encoding and transmitting the audio and/or video signals, and to a decoding apparatus for receiving those signals after unloading and transmission.

The interactive compact disc (CDI) on which data for text and graphic images and digital audio is stored has been developed in the last few years. The presentation possibilities of CDI are considerably enhanced if full motion video pictures are also recorded on it. The known analog recording of a video signal on compact disc video (CDV) is not suitable for this purpose. For this reason, a video signal on CDI is digitized.

A full-motion video scene is considered as a sequence of pictures (of that video scene) of which there are, for example, 25 or 30 per second. Each picture comprises, for example, 256 picture lines and 352 pixels per picture line. The sequence of pictures is converted by means of a suitably chosen encoding method into a series of video blocks, each comprising so much digital information that each picture can be reconstructed without any noticeable loss of quality. Together with the audio signal and further data, the encoded video signal is recorded optically. A CDI may comprise various video scenes.

The most efficient encoding methods convert successive signal portions into successive code blocks of variable lengths. In the case of a video signal, these signal portions are formed, for example, by the pictures or picture pairs of which the signal is composed. Some pictures may be subjected to intraframe coding and are then converted into code blocks from which the picture can be reconstructed completely. Other pictures may be subjected to interframe coding, which means that the pictures can only be reconstructed with the aid of previous pictures. The code blocks of a video signal will hereinafter be referred to as video blocks. Due to their variable length, the successive video blocks are read at irregular instants when a disc in which they are stored is being played. Moreover, the video blocks on the disc may alternate with (or may even by interrupted by) other data signals, for example, a lip-synchronous digital audio signal corresponding to the video scene.

The pictures corresponding to the video blocks should be displayed at a constant frequency of, for example, 25 frames per second. However, the instant when a video block of the disc is being read hardly ever corresponds exactly to the instant when the corresponding picture from the video scene is to be displayed. In a player, the video blocks are, therefore, applied to a memory buffer at a frequency which is entirely determined the way in which they are "packed" on the disc. Subsequently, the video block are read from the buffer at the picture frequency required for display. On an average, the number of video blocks applied per second from the disc to the buffer equals the number of pictures displayed per second. The video block corresponding to the next picture to be displayed will always have to be stored completely in the buffer. Moreover, the buffer will already comprise a subsequent video block, a portion thereof or even a number of subsequent video blocks. As soon as a picture has been decoded, the corresponding video block may be removed from the buffer. The buffer space then released is written by one or more subsequent video blocks or a portion thereof. The number of video blocks stored in the buffer for later display is thus variable, and is greatly dependent on the encoding efficiency and the presence of signals other than the relevant video signal on the disc.

It would seem that the display of a video scene can start as soon as the first video block has been received completely and is stored in the buffer. However, this is not the case. It is possible that a subsequent video block is too large to be scanned (and stored in the buffer) within the required time (1/25 sec) to (decode and) display the picture corresponding to the first video blank. As a result, the corresponding picture of the subsequent video block cannot be displayed in time. The absence of a complete video block in the buffer at the instant when the corresponding picture has to be decoded and displayed is sometimes referred to as underflow of the buffer.

Underflow of the buffer also occurs if a large quantity of other (non-video) data has been packed together with the video blocks of a scene causing the buffer to be temporarily not filled with video blocks. Because of that other data the buffer empties, and at a given instant the video block for the corresponding next picture to be displayed is not yet present. The display of the video scene then stalls, and the pictures are not smooth moving.

If the display of a picture of a video scene starts too late after the corresponding video block has been received, it is probable that the buffer will fill so that the display of the video scene also stalls. This is referred to as overflow of the buffer.

The same problems occur with audio signals which may also be recorded on the disc in a non-contiguous manner.

SUMMARY OF THE INVENTION

It is an object of the invention to provide a method of encoding audio and/or video signals (for transmission) in which the occurrence of overflow and underflow of a decoder buffer is prevented so that the display of pictures can proceed in an undisturbed manner.

According to the invention, a parameter is associated with at least one selected code block, which parameter indicates the quantity of delay with which that code block must be decoded after it has been received. If the corresponding picture is decoded with this delay, it can be displayed without the risk of overflow or underflow of the buffer. This ensures an undisturbed display. The transmission of the parameter, sometimes referred to as a decoder delay parameter (or decoder delay for short), also enables synchronous display of two signals, for example, a video signal with a time-division multiplexed associated audio signal, or two video signals jointly representing a three-dimensional video scene.

In principle, it is sufficient to associate the parameter with one video block. This will preferably be the first block of the video scene. All further pictures can then be read at a constant picture frequency without a further risk of overflow or underflow of the buffer.

In a further embodiment of the method, the decoder delay parameter is regularly associated with video blocks. The constant picture frequency can then be obtained in a favorable manner. Moreover, this provides the possibility of a so-called "random-access" display. This means the display of a fragment of a video scene from the video block with which the decoder delay is associated.

The decoder delay parameter may assume various formats, but it preferably indicates the state of a counter which is regularly loaded with a reference value which is also transmitted and which counter further receives a predetermined clock signal.

BRIEF DESCRIPTION OF THE DRAWINGS

FIGS. 1A–E show diagrammatically an optically readable disc with an audio and/or video signal recorded thereon and the format of that disc.

FIGS. 3A–C show some time diagrams which help explain the circuit of FIG. 2.

FIGS. 4A–D shows some further time diagrams to explain the circuit of FIG. 2.

DETAILED DESCRIPTION OF PREFERRED EMBODIMENTS OF THE INVENTION

FIG. 1A shows diagrammatically an optically readable disc 1 with an information track 2 recorded thereon. A so-called sector, of which there may be about 300,000, is present between every two successive points A, B, C, D, etc. The structure of such a sector is shown diagrammatically in FIG. 1B. It is divided into a sector header H or 24 bytes and a data field DF of 2324 bytes. The sector head H comprises a synchronization word SYN of 12 bytes, a sector number SCTNR of 4 bytes and a service word SW of 8 bytes. The synchronization word SYN marks the start of a sector. The sector number SCTNR indicates the ordinal number of the sector on the disc 1. The service word SW indicates whether the data field DF of the sector comprises video data, audio data or computer data. In conformity with that data, a sector is sometimes referred to as a video sector, an audio sector or a data sector.

The conventional rate of revolution of the disc 1 is such that 75 sectors per second are scanned. This corresponds to a bit rate, hereinafter referred to as channel bit rate, of approximately 1.4 Mbit/sec. If a disc comprises video sectors only, the video bit rate is equal to the channel bit rate. If a disc also comprises audio and data sectors, the video bit rate decreases accordingly.

FIG. 1C shows a part of the track 2 in which the sectors are denoted by SCT. More particularly the video sectors therein are shaded. The video sectors alternate with other sectors.

There are many encoding methods for reducing the number of bits per picture without deteriorating picture quality. The most efficient encoding methods convert successive pictures of a video scene into video blocks of distinct number of bits. In FIG. 1D, this is shown in the form of video blocks V1, V2, etc., each having a distinct length. For example, video block V1 has a length of 4 sectors on the disc 1, video block V2 has a length of 1½ sector, etc.

FIG. 1E shows the data format of a video block. The start of a video block is marked by the presence of a unique start-of-frame word SOF. The video block also comprises a label LBL in which specific control information is stored for the corresponding video block.

Figure 2:
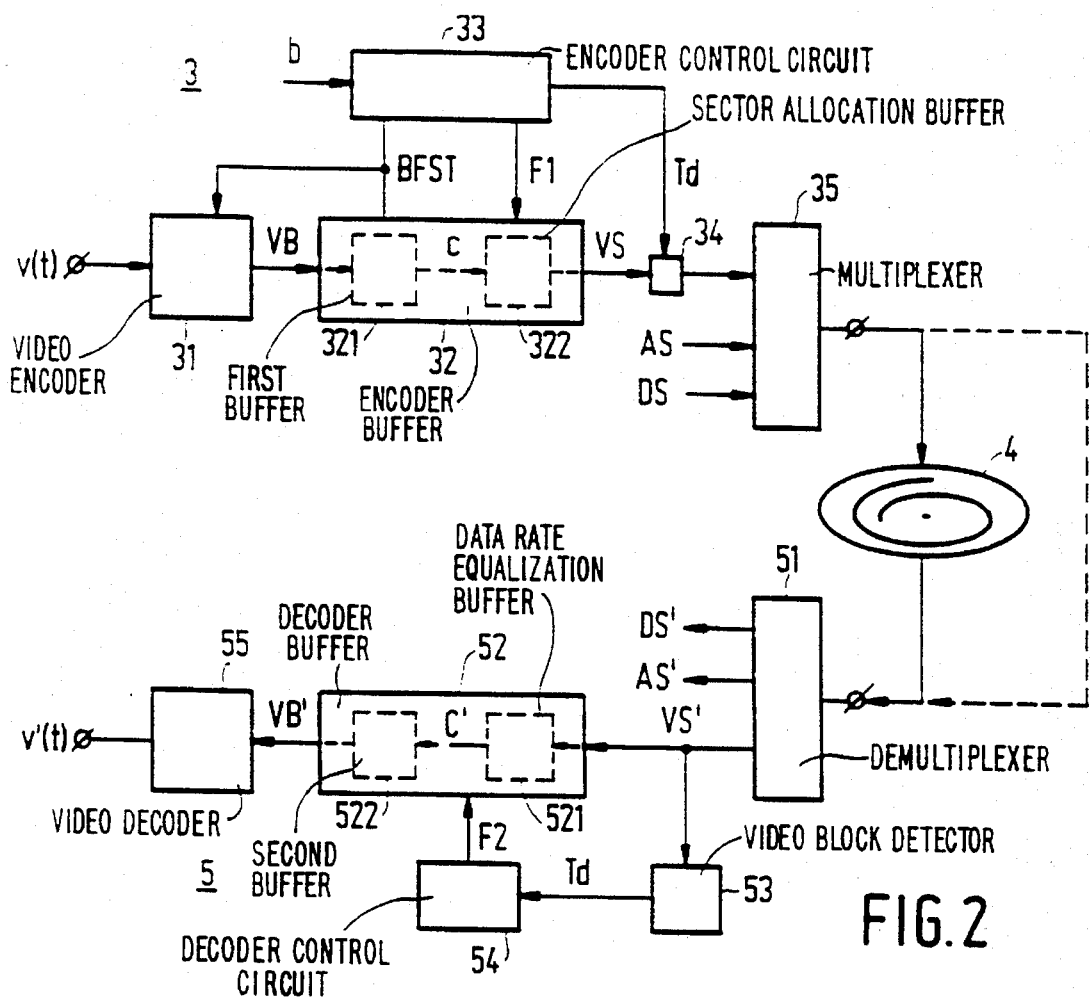
FIG. 2 shows the general structure of a transmission circuit suitable for performing the method according to the invention.

FIG. 2 shows the general structure of a circuit for transmitting audio and video signals. The circuit comprises an encoding apparatus 3, a compact disc 4 and a decoding apparatus 5.

The encoding apparatus 3 of FIG. 2 comprises a video encoder 31 to which a video signal v(t) is applied. The video encoder 31 encodes successive pictures of the video signal, of which there are 25 per second, into video blocks VB of variable lengths. These pictures are applied video block by video block to an encoder buffer 32. To prevent overflow and underflow of the encoder buffer 32, a buffer status signal BFST is fed back to the video encoder 31 so that the video encoder 31 can adapt the encoding efficiency to the contents of the encoder buffer 32. If the encoder buffer 32 tends to get filled and there is a risk of overflow, the video signal is temporarily quantized in a coarser manner. If the encoder buffer 32 tends to get empty, the video signal is quantized more accurately, or pseudo-video data is possibly temporarily applied to the encoder buffer 32. The buffer status signal BFST is also applied to an encoder control circuit 33. The encoder control circuit 33 of FIG. 2 is adapted to generate, at a predetermined degree of occupation of the encoder buffer 32, a clock signal F1 with which the encoder buffer 32 is read. The encoder control circuit 33 also determines the value of a parameter $T_d$ for each video block in a manner to be described hereinafter. This parameter $(T_d)$ is associated with a video block by means of an inserter 34 and transmitted in the label LBL of that block (see FIG. 1E).

As is shown in FIG. 2, the encoder buffer 32 may be considered to be divided into a first buffer 321 to which the video blocks VB are applied and which is read at a constant video bit rate C, and a sector allocation buffer 322 which converts this constant bit stream into video sectors VS. The video sectors VS are applied from the encoder buffer 32 to a first input of a multiplexer 35 which receives audio sectors AS at a second input and data sectors DS at a third input. The resultant bit stream is recorded on the compact disc 4.

When the compact disc 4 is played at a later stage, the sectors are scanned and applied to a demultiplexer 51 in which the video sectors VS' are separated from audio sectors AS' and data sectors DS' by reference to each sectors service word SW (see FIG. 1B). The video sectors VS' are applied to a decoder buffer 52 and a video block detector 53. The video block detector 53 detects the occurrence of a start-of-frame code SOF (see FIG. 1E) and reads from the subsequent label LBL the parameter $T_d$ transmitted therein. The parameter $T_d$ is applied to a decoder control circuit 54 which is adapted to read the decoder buffer 52 with a clock signal F2. In a manner to be described hereinafter, the parameter $T_d$ determines the instant when each video block is read from the decoder buffer 52.

As is shown in the FIG. 2, the decoder buffer 52 may be considered to be divided into a data rate equalization buffer 521 to which the video sectors VS' are applied and which is read at a constant video bit rate C', and a second buffer 522 which converts this constant bit stream into successive video blocks VB'. Finally, each video block is applied to a video decoder 55 for conversion into a picture. The successive pictures which are obtained are applied as a video signal v'(t) to a display device (now shown).

In practice the actual instant when a disc is being played does not play any role at all. Therefore, it will be assumed hereinafter that the output of the encoding apparatus 3 is directly connected to the input of the decoding apparatus 5. This is indicated by means of a broken line in FIG. 2.

It will be assumed for the time being that only video signals are transmitted. This means that the encoder buffer 32 can apply an uninterrupted bit stream to the disc 4 at the full channel bit rate of 1.4 Mbit/sec (75 sectors per second). This means that the sector allocation buffer 322 and the multiplexer 35, on the one hand, and the demultiplexer 51 and the data rate equalization buffer 521, on the other hand, of FIG. 2 do not play a role in the following discussion.

The operation of the circuit shown in FIG. 2 will be explained with reference to some time diagrams which are shown in FIGS. 3A–C. More particularly, FIG. 3B shows a number of successive pictures enumerated 1, 2, 3, etc. These pictures occur at a picture frequency of 25 frames per second and are applied to the video encoder 31 of FIG. 2. As soon as each picture has been encoded, the corresponding video block is written into the encoder buffer 32 of FIG. 2. For the sake of simplicity, it is assumed that this is effected timelessly. The quantity of video data cumulatively applied to the encoder buffer 32 and expressed in disc sectors increases step-wise for each video block. This is denoted by means of the curve $n_e(t)$ in FIG. 3A.

Reading of the encoder buffer 32 of FIG. 2 and applying data to the output of the encoding apparatus 3 of FIG. 2 starts from instant t1. This instant t1 is determined, for example, by reaching a predetermined degree b of occupation of the encoder buffer 32 and may be different for each video scene. Reading is effected at a constant rate of 75 sectors per second, i.e., 1.4 Mbit/sec. The quantity of video data cumulatively withdrawn from the encoder buffer 32 increases linerally. This is denoted by means of the curve $n_s(t)$ in FIG. 3A. The curves $n_e(t)$ and $n_s(t)$ must not intersect each other because this would mean that a video block is read from the encoder buffer 32 before it is written into it (underflow of the encoder buffer 32). As already previously stated, underflow of the encoder buffer 32 is prevented by adapting the quantization of the video scene to the contents of the encoder buffer 32.

Based on the assumption that the output of the encoding apparatus 3 of FIG. 2 is directly connected to the input of the decoding apparatus 5 of FIG. 2, the curve $n_s(t)$ shown in FIG. 3A also indicates the cumulative quantity of video data applied to the decoder buffer 52 of FIG. 2. The decoder buffer 52 must be read in such a manner that the curve $n_s(t)$ is not exceeded, because underflow of the decoder buffer 52 could then occur. Overflow of the decoder buffer 52 should not occur either. In FIG. 3A line $n_1(t)$ at a distance B (the buffer size) from the line $n_s(t)$ indicates the threshold of overflow of the decoder buffer 52. The 52 line $n_1(t)$ should not be exceeded by the curve $n_s(t)$.

The decoder buffer 52 of FIG. 2 is read video block by video block. For the sake of simplicity, it is assumed that a video block is read timelessly. The quantity of video data cumulatively withdrawn from the decoder buffer 52 and expressed in disc sectors increases step-wise for each video block. This is denoted by means of the curve $n_d(t)$ in FIG. 3A. As soon as a video block has been read and decoded, the corresponding picture is displayed in 1/25 sec. FIG. 3C shows the display of the decoded pictures 1, 2, 3, etc.

The curve $n_d(t)$ is a replica of the curve $n_e(t)$ shifted over a time interval $T_e+T_d$. Here $T_e$, also referred to as an encoder delay, is the delay time between the instant when the first video block of the video scene is written into the encoder buffer 32 of FIG. 2 and the instant t1 when the transmission of this video block begins. In a corresponding manner $T_d$, also referred to as a decoder delay, is the delay time between the instant when the reception of the first video block in the decoder buffer 52 of FIG. 2 begins and the instant when this video block is read from the decoder buffer 52. The time interval $T_e+T_d$ represents the delay time occurring between writing a video block into the encoder buffer 32 and reading the same video block from the decoder buffer 52. This delay time is constant. As previously noted, t1, and consequently $T_e$, may be different for each video scene. In addition (and in conformity therewith), the decoder delay $T_d$ may be different for each video scene as well.

The instant when the decoding apparatus of FIG. 2 starts reading the decoder buffer 52 of FIG. 2 is of great importance. In fact, if the decoder 5 should start reading too early, there may be underflow of the decoder buffer 52 because the curve $n_d(t)$ will intersect the boundary line $n_s(t)$. If the decoder 5 starts reading too late, there may be overflow of the decoder buffer 52 because the curve $n_d(t)$ will intersect the boundary line $n_1(t)$. Both underflow and overflow may become manifest in the video scene at a possibly later stage.

Overflow and underflow of the decoder buffer 52 of FIG. 2 do not occur if the curve $n_d(t)$ is always as far remote from the boundaries lines $n_s(t)$ and $n_s(t)$ as the curve $n_e(t)$ is from boundaries lines $n_2(t)$ and $n_s(t)$. Line $n_2(t)$ is a line at a distance B (the decoder buffer size) from the line $n_e(t)$. This is realized by choosing a suitable value for the decoder delay $T_d$, as well as by the previously mentioned mechanism of adaptive quantization in the encoding apparatus 3 of FIG. 2, which ensures that the curve $n_e(t)$ remains completely between the two boundaries lines $n_2(t)$ and $n_s(t)$.

A suitable value for decoder delay $T_d$ can be obtained by considering the fact that the previously mentioned delay time $T_e+T_d$ is equal to a time interval T shown in FIG. 3A. The time interval T corresponds to the time required to fully read a completely filled encoder buffer or to completely fill a still empty decoder buffer, and is entirely determined by the buffer size B and the video bit rate at which that buffer is read or written. Accordingly, the value of $T_d$ can be derived from the computation of the different $T-T_e$. Here both $T_e$ and T are known to the encoding apparatus.

The encoding apparatus 3 of FIG. 2 associates the decoder delay $T_d$ as a parameter with the first video block of the scene so as to enable the decoding apparatus 5 of FIG. 2 to determine the instant when reading of the decoder buffer 52 of FIG. 2 should start. After the decoding apparatus 5 has read the video block with the delay $T_d$ from the encoder buffer 52, the reading process can be continued at the picture frequency in an autonomic manner without the risk of underflow or overflow of the decoder buffer 52. The picture frequency of 25 Hz can be obtained by dividing the channel bit rate (75 sectors/sec*2324 bytes/sector*8 bits/byte) by 55776. The coupling of the picture frequency to the channel bit rate which is necessary for this purpose is, however, superfluous if the decoder delay parameter has regularly been associated with video blocks. In such a case, the decoder delay will generally be different for each video block.

If the difference between the actual instant when a video block is read and the instant determined by the corresponding decoder delay parameter occurs at a given picture frequency, the picture frequency or the rate of revolution of the disc can be corrected in response to this difference. FIG. 3A shows by way of example a decoder delay $T_{d7}$ for picture 7. At the instant denoted by t2 the video block corresponding to picture 7 is written into the encoder buffer 32 of FIG. 2. After encoder delay $T_{e7}$, transmission of the video block corresponding to picture 7 from the encoder buffer 32 to the encoder buffer 52 of FIG. 2 starts, and after a subsequent decoder delay $T_{d7}$, that video block must be decoded. The encoding apparatus 3 of FIG. 2 associates the decoder delay $T_{d7}=T-T_{e7}$ for picture 7 with video block 7 and transmits it in the label LBL of this block (see FIG. 1E).

The regular transmission of the decoder delay also provides the possibility of a so-called "random-access" playback mode. This means playing a fragment of the video scene from a picture other than the first picture. For example, the decoder delay $T_{d7}$ shown in FIG. 3A can be used to play the fragment of the video scene from picture 7. Picture 7 is preferably an intraframe-encoded picture and can therefore be reconstructed without the aid of previous pictures. In principle, it is possible to compute the decoder delay $T_{d7}$ for picture 7 from the previous signal. However, such computations are complicated and also require the availability of previous information. In the case of random-access display, the previous signal is, however, not available.

The situation described above will be more complicated if not all disc sectors are allocated to video data. If the disc also comprises sectors with audio and computer data, they will alternate with video sectors on the disc. The average video bit rate for a video scene will now be lower than 75 sectors per second. The average video bit rate will hereinafter be expressed in a number S indicating which part of the channel bit rate is suitable for video transmission. For example, S=½ means that on an average 1 out of 2 sectors is a video sector. This corresponds to a video bit rate of ½*75=37.5 sectors per second, i.e., 0.7 Mbit/sec.

For the purpose of illustration, FIG. 4 shows some time diagrams of the encoding and decoding process if S=½. FIG. 4B shows diagrammatically the successive pictures 1, 2, etc. of a video scene applied to the encoding apparatus 3 of FIG. 2. The curve $n_3(t)$ in FIG. 4A indicates the quantity of video data applied for each picture to the encoder buffer 32 of FIG. 2 and expressed in the number of disc sectors. In comparison with the curve $n_e(t)$ in FIG. 3A, the encoding is now such that on average each picture is encoded in 1.5 sectors instead of in 3 sectors. The contents of the encoder buffer 32 are applied to selected sectors of the disc. This is effected in accordance with a given pattern, an example of which is shown in FIG. 4C. In the pattern shown in FIG. 4C, the shaded sectors represent video sectors and the other sectors are audio sectors or data sectors. FIG. 4C also shows the signal controlling the multiplexer 35 of FIG. 2. The average bit rate is reached in this example by writing video information on 8 out of each 16 sectors on the disc. The quantity of video data cumulatively applied to the disc is indicated in FIG. 4A by means of the curve $n_s(t)$.

When the disc is being played, the reverse operations take place. The curve $n_s(t)$ now represents the number of video sectors cumulatively read from the disc. These sectors are applied to the decoder buffer 52 of FIG. 2, from which they are subsequently read video block by video block in accordance with the curve $n_d(t)$.

In FIG. 4A, $n_e(t)-n_s(t)$ indicates the actual contents of the encoder buffer 32 of FIG. 2. To prevent underflow of the encoder buffer 32, the curves $n_e(t)$ and $n_s(t)$ should not intersect each other. This condition is certainly met if, as already shown in FIG. 2, the encoder buffer 32 is considered to be divided into a first buffer 321 to which the video blocks are applied and which is read at a constant video bit rate, and a sector allocation buffer 322 which converts this constant bit stream into the sector-sequential supply of sectors to the disc. That constant bit stream is denoted by the straigth line $c_e(t)$ in FIG. 4A. The slope of the line $C_e(t)$ is the average bit rate, 0.7 Mbit/sec in this example. As long as the two curves $n_e(t)$ and $n_s(t)$ do not intersect the line $c_e(t)$, there is no encoder buffer underflow.

In a corresponding manner, $n_s(t)-n_d(t)$ represents the actual contents of the decoder buffer 52 of FIG. 2. To prevent underflow of the decoder buffer 52, the curve $n_e(t)$ should not intersect the curve $n_s(t)$. This condition is certainly met if, as already shown in FIG. 2, the decoder buffer 52 is considered to be divided into a data rate equalization buffer 521 having a size of B1 to which the video sectors of the disc are applied and which is read at the constant bit rate, and a second buffer 522 of the size B2 which converts this constant bit stream into video blocks. That constant bit stream is denoted by the straight line $c_d(t)$ in FIG. 4A. The slope of the line $c_d(t)$ corresponds to the average video bit rate of 0.7 Mbit/sec. As long as the two curves $n_s(t)$ and $n_d(t)$ do not intersect the line $c_d(t)$, there is no decoder buffer underflow.

The previously mentioned decoder delay parameter ($T_d$) which indicates when the decoding apparatus 5 of FIG. 2 can read a video block from the decoder buffer 52 of FIG. 2 after the first bit of the video scene has been scanned (i.e. read from the disc), is now equal to $T_{cd}+T_{vd}$ shown in FIG. 4A. Its value is completely determined by the encoding apparatus 3 of FIG. 2 and transmitted in the label LBL (see FIG. 1E) of a corresponding video block.

The decoder delay parameter is determined as follows. The value of $T_{cd}+T_{vd}$ follows from the consideration that $T_{ve}+T_{ce}+T_{cd}+T_{vd}$ corresponds to the delay of the video signal (from being read into the encoder buffer 32 of FIG. 2 to being read out of decoder buffer 52 of FIG. 2) if the output of the encoding apparatus 3 of FIG. 2 is directly coupled to the input of the decoding apparatus 5 of FIG. 2. This delay is equal to the interval T shown in FIG. 4A and is dependent on the average video bit rate which is S*75 sectors per second and the size B (=B1+B2) of the decoder buffer 52 of FIG. 2. More particularly, it can be derived from FIG. 4A that $$T=\frac{B}{S*75}$$

and $$T_{cd}+T_{vd}=T-(T_{ve}+T_{ce}).$$

Here. S is fixed when writing the disc. As for the decoder buffer size B, it holds that it may be a predetermined fixed value which is fixed in the encoding apparatus 3 of FIG. 2 as well as in the decoding apparatus 5 of FIG. 2. The encoding apparatus 3 may also be adapted to transmit the buffer size B to be reserved in the decoding apparatus 5 as a further parameter. It is notably sensible to render the decoder buffer size B dependent on S. The (encoder) delay ($T_{ve}+T_{ce}$), being the time between the encoding of a video picture and its transmission, is determined by the encoding apparatus 3 itself. As already previously stated, the insant when the first video block is transmitted may be determined by reaching a predetermined degree of occupation of the encoder buffer 32.

The form of the transmitted decoder delay parameter may assume several formats. For example, it is possible to transmit a value indicating at which degree of occupation of the decoder buffer 52 of FIG. 2 the decoder 5 of FIG. 2 should start reading. This degree of occupation may be expressed in an absolute value (number of bits) or in a relative value (fraction of the buffer size B). The decoder delay parameter may also indicate the time delay in suitably chosen units with respect to the instant when a video block is written into the decoder buffer 52. Suitable units are, for example, (m) sec or the number of clock periods of a predetermined clock signal. It has been found useful to have the decoder delay parameter indicate the state of a counter at which the decoding of a video block should start The counter is then regularly loaded with a reference value which is also transmitted. The counter is further clocked by a predetermined clock signal. The transmitted reference value may form part of the service word SW (see FIG. 1B). A suitable frequency of the clock signal is 90 kHz. This value is an integral multiple of the picture frequencies 24 Hz, 25 Hz, 30 Hz and 29.97 Hz which are suitable for display.

Finally, it is to be noted that in the foregoing the decoder delay parameter is only described for one signal, in this case a video signal. However, the decoder delay parameter also enables the synchronous display of a plurality of signals. These may be, for example, a video signal and an associated lipsynchronous audio signal. However, they may also be two vide signals multiplexed on the compact disc, which signals may not only be displayed separately but, also if desired, simultaneously. This is shown diagrammatically in FIG. 5 for two video signals A and B.

Figure 5:
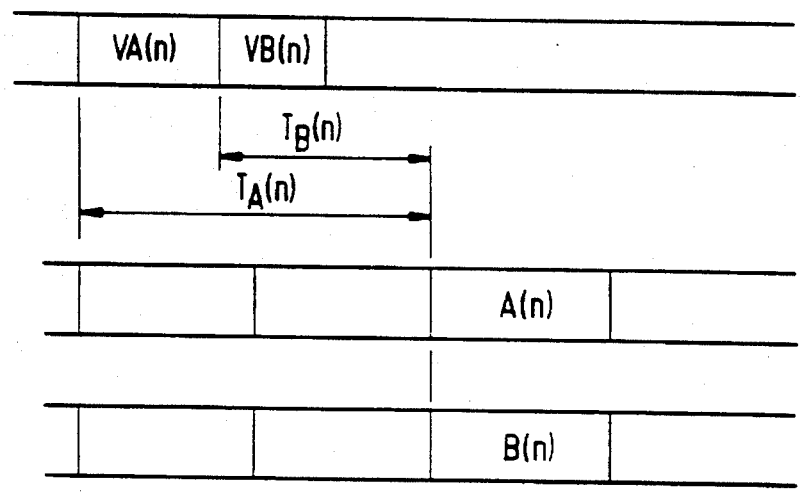
FIG. 5 shows some time diagrams to explain the transmission of two simultaneously transmitted signals.

FIG. 5 shows a video block VA(n) and VB(n) of the two signals, in which n is the ordinal number of the corresponding picture to be displayed. As is apparent from FIG. 5, the decoder delay parameters $T_A(n)$ and $T_B(n)$ transmitted in the video block have such a value that the corresponding pictures A(n) and B(n) are displayed simultaneously.

We claim:

1. A record carrier for use with a decoding device which decodes an audio and/or video signal which has been encoded as successive code blocks making up an encoded signal, which decoding device includes a decoder buffer for receiving the encoded signal and a decoder for decoding the encoded signal, the record carrier comprising:

the code blocks; and a delay time parameter which represents a length of time during which a code block of the code blocks is to be stored within the decoder buffer before decoding by the decoder in order to ensure that the decoder buffer will not experience overflow or underflow of the code blocks.

2. The record carrier as claimed in claim 1, wherein the delay time parameter is included in the code block.

3. The record carrier as claimed in claim 1, wherein the code block is a first code block of the code blocks.

4. The record carrier as claimed in claim 1, wherein the delay time parameter represents the length of time during which each of the code blocks is to be stored within the decoder buffer before decoding by the decoder in order to ensure that the decoder buffer will not experience overflow or underflow of the code blocks.

5. The record carrier as claimed in claim 1, further comprising a plurality of delay time parameters which are each associated with and included in a different one of the code blocks.

6. The record carrier as claimed in claim 1, wherein the delay time parameter is a time indication.

7. The record carrier as claimed in claim 1, wherein the delay time parameter is a number of clock period of a predetermined clock signal.

8. The record carrier as claimed in claim 1, wherein the delay time parameter is the state of a counter.

9. The record carrier as claimed in claim 1, wherein the delay time parameter is the degree of occupation the decoder buffer must be at before the code block, after being included therein, is to be decoded.

* * * * *